(12) United States Patent
Mora et al.

(10) Patent No.: US 10,409,133 B2
(45) Date of Patent: Sep. 10, 2019

(54) SELF-POWERED AND REVERSIBLE LIGHT-DIRECTED ELECTROPHORETIC DEPOSITION DEVICE FOR USE IN SMART WINDOWS AND PHOTODETECTOR DISPLAYS

(71) Applicant: Lawrence Livermore National Security, LLC, Livermore, CA (US)

(72) Inventors: Jeronimo Mora, Oakland, CA (US); Brian Giera, Oakland, CA (US); Jessica Katheryn Dudoff, Northglenn, CO (US); Elaine Lee, Brooklyn, NY (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/612,964

(22) Filed: Jun. 2, 2017

(65) Prior Publication Data

US 2018/0120663 A1    May 3, 2018

Related U.S. Application Data

(60) Provisional application No. 62/415,422, filed on Oct. 31, 2016.

(51) Int. Cl.
| | |
|---|---|
| *G02B 26/00* | (2006.01) |
| *G02F 1/167* | (2019.01) |
| *C25D 13/22* | (2006.01) |
| *G02F 1/1339* | (2006.01) |
| *G02F 1/135* | (2006.01) |
| *E06B 9/24* | (2006.01) |
| *C25D 13/02* | (2006.01) |

(52) U.S. Cl.
CPC ............. *G02F 1/167* (2013.01); *C25D 13/02* (2013.01); *C25D 13/22* (2013.01); *E06B 9/24* (2013.01); *G02F 1/1354* (2013.01); *G02F 1/13394* (2013.01); *E06B 2009/2464* (2013.01)

(58) Field of Classification Search
CPC ...................................................... G02F 1/167
USPC ........................................................ 359/296
See application file for complete search history.

(56) References Cited

U.S. PATENT DOCUMENTS 3,767,392 A * 10/1973 Ota .................... G02F 1/167
                                                      204/478
4,475,031 A   10/1984 Mockovciak, Jr.
(Continued)

OTHER PUBLICATIONS

Zheng et al., "Quasicubic r-Fe2O3 Nanoparticles with Excellent Catalytic Performance," The Journal of Physical Chemistry B, vol. 110, No. 7, Jan. 31, 2006, pp. 3093-3097.
(Continued)

*Primary Examiner* — James C. Jones
(74) *Attorney, Agent, or Firm* — Zilka-Kotab

(57) ABSTRACT

According to one embodiment, a system includes a first sheet being nonopaque, a second sheet being nonopaque spaced from the first sheet, a spacer positioned between the first sheet and the second sheet, a chamber defined between the first and second sheets and the spacer, and a fluidic solution in the chamber. In addition, the first sheet includes a photoconductive layer. Moreover, solution has a plurality of particles, where the particles in the solution are attracted to illuminated portions of the photoconductive layer upon illumination of said portions in the absence of an external voltage applied to the first and second sheets.

20 Claims, 4 Drawing Sheets

(56) References Cited

U.S. PATENT DOCUMENTS

2011/0250467 A1 10/2011 Rose et al.
2012/0269218 A1* 10/2012 Worsley .................. C25D 5/10
372/39

OTHER PUBLICATIONS

Stober et al., "Controlled Growth of Monodisperse Silica Spheres in the Micron Size Range," Journal of Colloid Interface Science, vol. 26, 1968, pp. 62-69.
Lee et al,. "An ultraviolet photo-detector based on TiO2/water solid-liquid heterojunction," Applied Physics Letters, vol. 99, 2011, pp. 251102-1 to 251102-3.
Xie et al., "A self-powered UV photodetector based on TiO2 nanorod arrays," Nanoscale Research Letters, vol. 8, No. 188, 2013, pp. 1-6.
Besra et al., "Electrophoretic Deposition of YSZ Particles on Non-Conducting Porous NiO-YSZ Substrates for Solid Oxide Fuel Cell Applications," Journal of American Ceramic Society, vol. 89, No. 10, 2006, pp. 3003-3009.
Ding et al., "A self-powered photodetector based on a CH3NH3PbI3 single crystal with asymmetric electrodes," CrystEngComm, 2016, pp. 1-7.
Pascall et al., "Light-Directed Electrophoretic Deposition: A New Additive Manufacturing Technique for Arbitrarily Patterned 3D Composites," Advanced Materials, vol. 26, 2014, pp. 2252-2256.
Dalisa, A., "Electrophoretic Display Technology," IEEE Transactions on Electron Devices, vol. ED-24, No. 7, Jul. 1977, pp. 827-834.
Besra et al., "Electrophoretic deposition on non-conducting substrates: The case of YSZ film on NiO-YSZ composite substrates for solid oxide fuel cell application," Journal of Power Sources, vol. 173, 2007, pp. 130-136.
Han et al., "Self-powered visual ultraviolet photodetector with Prussian blue electrochromic display," ChemComm, vol. 50, 2014, pp. 802-804.
Liu et al., "Growth of Oriented Single-Crystalline Rutile TiO2 Nanorods on Transparent Conducting Substrates for Dye-Sensitized Solar Cells," Journal of the American Chemical Society, vol. 131, No. 11, Feb. 26, 2009, pp. 3985-3990.
Wang et al., "Hydrogen-Treated TiO2 Nanowire Arrays for Photoelectrochemical Water Splitting," Nano Letters, vol. 11, 2011, pp. 3026-3033.
Liu et al., "Highly Water-Dispersible Biocompatible Magnetite Particles with Low Cytotoxicity Stabilized by Citrate Groups," Angewandte Chemie, vol. 48, 2009, pp. 5875-5879.
Welte et al., "Application of optical absorbance for the investigation of electronic and structural properties of sol-gel processed TiO2 films," Thin Solid Films, vol. 516, 2008, pp. 7256-7259.
Lu et al., "A Self-Powered and Stable All-Perovskite Photodetector-Solar Cell Nanosystem," Advanced Functional Materials, vol. 26, 2016, pp. 1296-1302.
Mora et al., U.S. Appl. No. 16/450,773, dated Jun. 24, 2019.

* cited by examiner

FIG. 3A
FIG. 3B
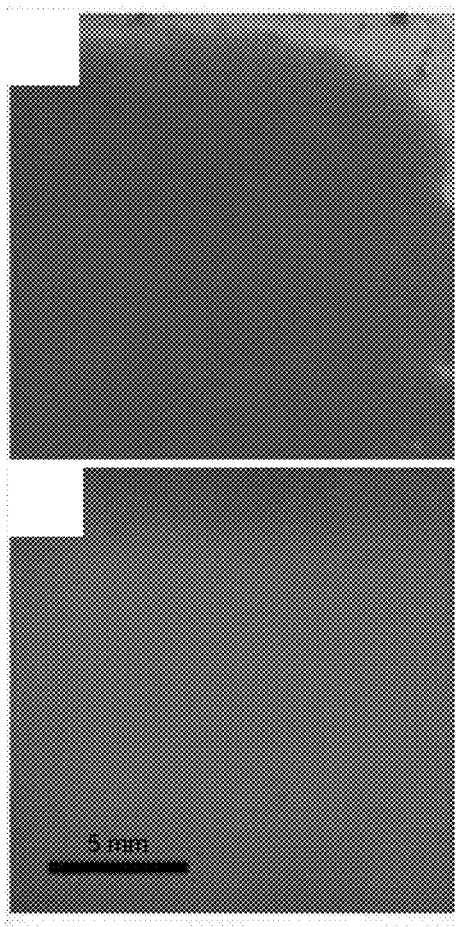
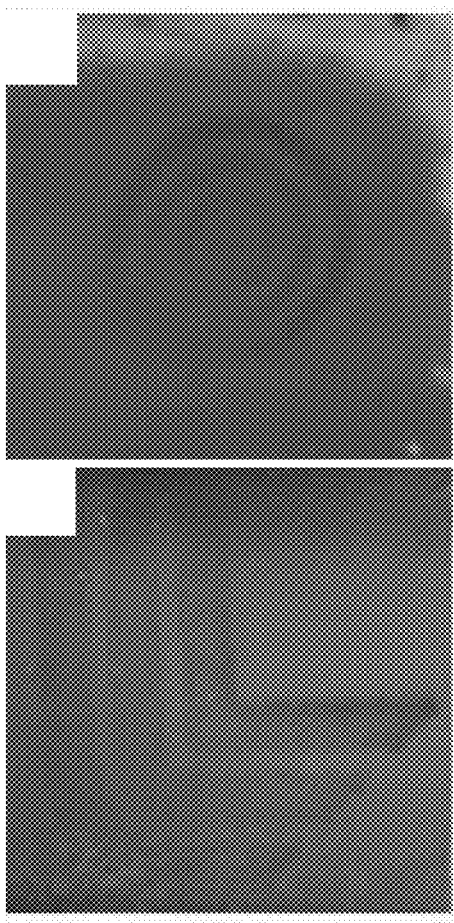
FIG. 3C
FIG. 3D

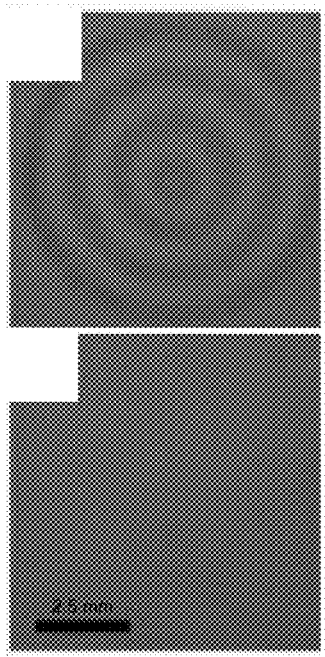 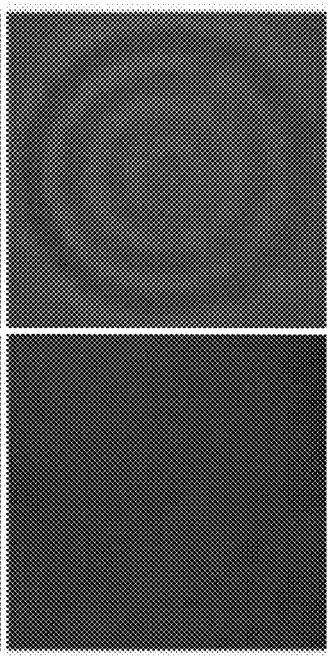 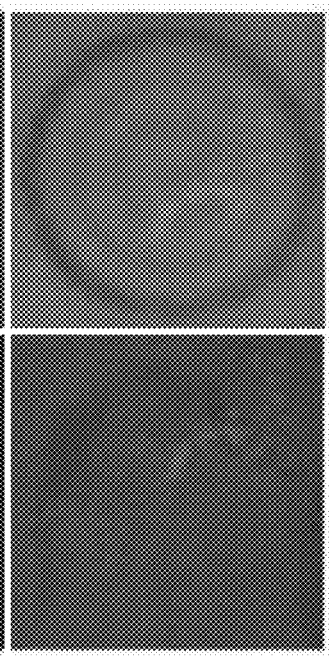
FIG. 4A  FIG. 4B  FIG. 4C
FIG. 4D  FIG. 4E  FIG. 4F

SELF-POWERED AND REVERSIBLE LIGHT-DIRECTED ELECTROPHORETIC DEPOSITION DEVICE FOR USE IN SMART WINDOWS AND PHOTODETECTOR DISPLAYS

RELATED APPLICATIONS

This application claims priority to Provisional U.S. Appl. No. 62/415,422 filed on Oct. 31, 2016, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to electrophoretic deposition devices, and more particularly, this invention relates to a self-powered and reversible light-directed electrophoretic deposition device.

BACKGROUND

Many buildings, especially skyscrapers, use a significant amount of air conditioning to keep their interiors cool. Electronic window shades or tinting rely on an external power source, and thus, wiring many windows becomes problematic. These smart window applications depend on an applied bias to hold the transparent state; without power the windows default to opaque.

Some self-powered devices, for example, photoelectrochemical (PEC) devices, use incident light and photoconductors to generate electron-hole pairs and cause chemical reactions to generate energy; however, these devices rely on external circuits to move electrons. It would be desirable to develop a self-powered system that does not rely on an external circuit, and rather operates in an open circuit condition.

In other window applications, a self-powered sun shade has been shown to be problematic. The sun shade utilizes liquid crystals, but these crystals degrade over time and thus have a limited life span. Thus, it would be desirable to develop a self-powered open circuit sun shade with longer lasting components.

SUMMARY

According to one embodiment, a system includes a first sheet being nonopaque, a second sheet being nonopaque spaced from the first sheet, a spacer positioned between the first sheet and the second sheet, a chamber defined between the first and second sheets and the spacer, and a fluidic solution in the chamber. In addition, the first sheet includes a photoconductive layer. Moreover, solution has a plurality of particles, where the particles in the solution are attracted to illuminated portions of the photoconductive layer upon illumination of said portions in the absence of an external voltage applied to the first and second sheets.

According to another embodiment, a system includes a first sheet being nonopaque, a second sheet being nonopaque spaced from the first sheet, a spacer positioned between the first sheet and the second sheet, a chamber defined between the first and second sheets and the spacer, and a fluidic solution in the chamber. In addition, the first sheet comprises a photoconductive layer and the second sheet does not function as a counter electrode. Moreover, the solution has a plurality of nanoparticles in suspension, where the nanoparticles in the solution are attracted to illuminated portions of the photoconductive layer upon illumination of said portions in the absence of an external voltage applied to the first and second sheets. The first and second sheets are in an open circuit arrangement. Furthermore, the nanoparticles return to suspension in the solution upon absence of illumination of said portions.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 3A-3B are images of thin film boron suspension in PC on a deposition substrate open to air according to one embodiment.

FIG. 3C is an image of thin film boron suspension in PC before solar directed deposition according to one embodiment.

FIG. 3D is an image of thin film boron suspension in PC with 5 minutes of exposure to solar directed deposition according to one embodiment.

FIGS. 4A, 4B, 4C are images of light directed EPD with boron, hematite, and magnetite suspensions, respectively, according to various embodiments.

FIGS. 4D, 4E, 4F are images taken of the embodiments of FIGS. 4A, 4B, 4C, respectively, after 90 minutes without incident light following the light directed EPD.

DETAILED DESCRIPTION

Figure 1A:
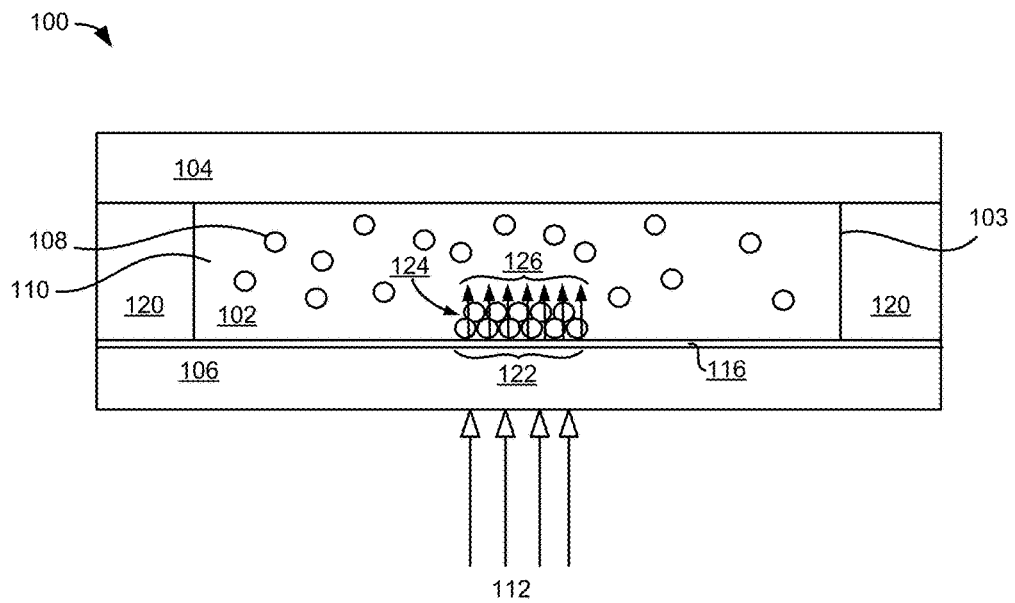
FIG. 1A depicts an apparatus for a self-powered, reversible light-directed electrophoretic deposition (EPD), in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of self-powered and reversible light-directed EPD and/or related systems and methods.

In one general embodiment, a system includes a first sheet being nonopaque, a second sheet being nonopaque spaced from the first sheet, a spacer positioned between the first sheet and the second sheet, a chamber defined between the first and second sheets and the spacer, and a fluidic solution in the chamber. In addition, the first sheet includes a photoconductive layer. Moreover, solution has a plurality of particles, where the particles in the solution are attracted to illuminated portions of the photoconductive layer upon illumination of said portions in the absence of an external voltage applied to the first and second sheets.

In another general embodiment, a system includes a first sheet being nonopaque, a second sheet being nonopaque spaced from the first sheet, a spacer positioned between the first sheet and the second sheet, a chamber defined between the first and second sheets and the spacer, and a fluidic solution in the chamber. In addition, the first sheet comprises a photoconductive layer and the second sheet does not function as a counter electrode. Moreover, the solution has a plurality of nanoparticles in suspension, where the nanoparticles in the solution are attracted to illuminated portions of the photoconductive layer upon illumination of said portions in the absence of an external voltage applied to the first and second sheets. The first and second sheets are in an open circuit arrangement. Furthermore, the nanoparticles return to suspension in the solution upon absence of illumination of said portions.

A list of acronyms used in the description is provided below.
C Celsius
EPD Electrophoretic deposition
EtOH Ethanol
FTO Fluorine-doped tin oxide
ITO Indium tin oxide
PC Propylene carbonate
TEOX Tetraethyl orthosilicate
TNR Titania nanorods
UV Ultraviolet Embodiments described herein address the reversibility of light directed EPD in a device that functions with a photoconductive electrode but not necessarily with a counter electrode nor an applied bias. In some approaches, the photoconductive substrate generates the local electric field without the need for a counter electrode. In some approaches, the device may include a transparent electrode in which the device may operate with on-demand activity or applied bias. Furthermore, the device may be self-powered such that the electric field is generated from the incident light shining on the photoconductive electrode. There is no need for an external power source, but one could be added to increase functionality. Wherever the light hits the photoconductive material of the electrode is where the field of opacity is enhanced by gathering nanoparticles.

Using light to dynamically control electric fields without the need for external power source may be useful in the development of window sun shades or displays for optics and buildings. An example of the embodiments described may be a window structure. The window has two transparent sheets, in which one sheet has a transparent photoconductive substrate. A solution of nanoparticles suspended in fluid is sealed between the two transparent sheets. The fluid, in the absence of bright light, depending on the nanoparticles may appear clear or colored because the spacing between the nanoparticles is far apart. When light is shined on to the transparent sheets at a significant intensity and/or a specific wavelength, photoconductive material in one of the transparent sheets generates a localized electric field in response to light shined upon the photoconductive material. The nanoparticles in the fluid are attracted to the electric field and deposit onto the photoconductive electrode transparent sheet. Depending on the concentration of nanoparticles and type of nanoparticles used, the nanoparticles deposited on the photoconductive transparent sheet causes the sheet to change in response to the light or light-initiated stimuli, for example, change color, lose transparency, gain transparency, etc.

Various embodiments described herein function to provide shading and cooling using light-activated EPD with only radiant incident light, and moreover, may tune the amount of light that comes into a window. Energy consumption may be reduced since the device is self-powered. Furthermore, embodiments described herein may reduce heating of the building by blocking radiant sun light coming into through the window.

Various embodiments described herein may use only one photoconductive electrode in an open circuit system. In contrast, conventional photoelectrical cell devices function with a complete circuit using photoconductors and incident light. Furthermore, conventional photoelectric cells rely on an external circuit for a current to generate electricity. The light-directed EPD described herein may occur in the absence of a counter electrode and in the absence of an applied field. The device may operate with light but without applied voltage from an external source.

Furthermore, some embodiments described herein allow for arbitrarily patterned EPD using dynamically activated electric fields without an applied bias or counter electrode. A window as described by various embodiments may be patterned by incoming light using a photo mask that may block certain wavelengths of light from illuminating portions of the photoconductive electrode, whereby the wavelengths that pass through the unmasked portions may induce formation of an electric field in the exposed portion of the photoconductive electrode. In another approach, the photoconductive electrode may be patterned so that the nanoparticles only deposit in certain areas. In yet another approach, the incoming light might be shaped in a specific pattern, for example by a projector projecting a certain pattern. Moreover, in yet another approach, a physical mask of the incoming light may provide designs on the EPD window. For example, directed shadows provide areas where illumination is absent and thus deposition of nanoparticles may not happen in these shaded areas. These methods may allow for arbitrary images and patterns to appear on the window.

Various embodiments described herein allow for the specific tuning of the device during construction according to different applications, for example, shading in response to different wavelengths of incident light, patterned shading, aesthetic displays, specific color of the obscured region of shading, rate of shading, etc. The components of the device that may be tuned include the photoconductive electrode, nanoparticles that participate in EPD, incoming light, etc.

Figure 1B:
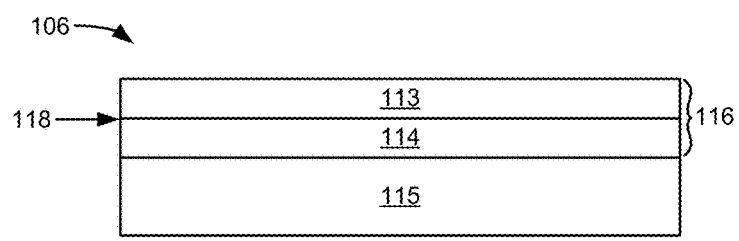
FIG. 1B depicts a first sheet of an apparatus for a self-powered, reversible light-directed EPD, in accordance with one embodiment.

FIG. 1A-1B depicts an apparatus 100 for a self-powered, reversible light-directed electrophoretic deposition, in accordance with one embodiment. As an option, the present apparatus 100 may be implemented in conjunction with features from any other embodiment listed herein, such as those described with reference to the other FIGS. Of course, however, such apparatus 100 and others presented herein may be used in various applications and/or in permutations which may or may not be specifically described in the illustrative embodiments listed herein. Further, the apparatus 100 presented herein may be used in any desired environment.

In one embodiment as shown in FIG. 1A, the apparatus 100 includes a first sheet 106 that is nonopaque. Nonopaque may be defined as allowing at least some incident light through from one side to the other, and may be clear, pellucid, transparent, translucent, etc. Moreover, the first sheet 106 includes a photoconductive layer 116 that acts as a deposition electrode. In various embodiments, the photoconductive layer 116 of the first sheet 106 is a photoconductive electrode.

The apparatus 100 includes a second sheet 104 spaced from the first sheet 106, the second sheet 104 being nonopaque. Moreover, the second sheet 104 may not function as a counter electrode. Ideally, the second sheet 104 does not have capabilities to function as a counter electrode. In some approaches, the second sheet 104 may have the capability to function as a counter electrode, but this capability may be unused, disabled, not functioning, etc.

In some approaches, the second sheet 104 may be constructed of a dielectric material, such as a transparent insulating material, e.g., glass. The second sheet 104 may or may not be encapsulated. In further approaches, the second sheet 104 may comprise a conductive material.

According to various embodiments, a spacer 120 may be positioned between the first sheet 106 and the second sheet 104.

According to various embodiments, the apparatus 100 includes a chamber 103 defined between the first and second sheets 106, 104 and the spacer 120. The chamber 103 contains a fluidic solution 110 and a plurality of particles 108 suspended in the fluidic solution 110, thereby creating a particle suspension 102. In some approaches, the chamber 103 may be sealed. In other approaches, the chamber may have a port in which the fluidic solution 110 with a plurality of particles 108 may be exchanged with another composition of fluidic solution with a different plurality of particles.

According to some embodiments, the particle suspension 102 may be sandwiched between a transparent insulating material and a photoconductive electrode using a spacer. In some approaches, the particle suspension 102 may be sandwiched between a transparent material of a second sheet 104 and the photoconductive layer 116 on the first sheet 106 with a spacer 120 between the second sheet 104 and the first sheet 106.

In various embodiments of apparatus 100, the particles 108 in the solution 110 may be attracted to illuminated portions 122 of the photoconductive layer 116 upon illumination of said portions 122 by light 112 in the absence of an external voltage applied to the first and second sheets 106, 104. In some approaches, the intensity of illumination of portions 122 of the photoconductive layer 116 induces the photoconductive layer 116 to emit a localized electric field 126 thereby causing the attraction of particles 108 at the illuminated portions 122 of the photoconductive layer 116 that emits the electric field 126. In some approaches, other effects may change the characteristics of the photoconductive layer on the first sheet thereby resulting in attraction of particles from the solution to the photoconductive layer 116. For example, a chemical change to the photoconductive layer may cause the photoconductive layer to become charged. Oppositely-charged particles would then be attracted to the photoconductive layer and deposit thereupon.

According to various embodiments, the photoconductive layer includes a photoconductive material layered on a nonopaque conductive material. As shown in FIG. 1B, in illustrative embodiments, a photoconductive layer 116 includes a photoconductive material 113, that may be transparent or nonopaque, layered on conductive material 114, that may be transparent or nonopaque. In some approaches, the photoconductive layer 116 (transparent photoconductive 113/conductive material 114) may be deposited onto a transparent or nonopaque insulating material 115. The insulating material 115 of the first sheet 106 may be the same as the material of the second sheet 104. In another approach, the transparent insulating material 115 of the first sheet 106 may be different from the material of the second sheet 104.

In various embodiments, the first and second sheets of apparatus may be configured in an open circuit arrangement. For example, the photoconductive layer 116 of the first sheet 106 and the second sheet 104 may not be electrically coupled together. In other approaches, the second sheet 104 may be dielectric or have a dielectric outer surface. In spite of the open circuit arrangement, in some embodiments, electron hole pairs may be generated in the portions 122 of the photoconductive layer 116 illuminated by projected light 112 thereby generating a local electric field 126 and causing the particles 108 to deposit onto the illuminated portions 122 of the photoconductive layer 116.

In an illustrative embodiment shown in FIG. 1A, as light 112 shines on the photoconductive layer 116 of the first sheet 106, an open circuit voltage may be generated at the photoconductor/conductor junction 118 (as indicated in FIG. 1B) creating a local electric field 126, and thereby inducing electrophoretic deposition of the particles 108 in solution 110 onto the illuminated portions 122 of the photoconductive layer 116.

In various embodiments, the photoconductive layer 116 may include any material that can create an electric field 126 upon illumination with light 112. In some embodiments, the photoconductive layer 116 may be a photovoltaic material. Referring to FIG. 1B, the transparent photoconductive material 113 may be fabricated of materials used in photovoltaic operations, for example, zinc oxide, titanium dioxide, titania nanorods (TNR), etc. The material 114 may be fabricated from transparent conductive materials, for example, indium tin oxide (ITO), fluorine-doped tin oxide (FTO), metal nanowires, metal mesh, graphene, carbon nanotubes, etc. The photoconductive material may be tuned to contain materials that only emit an electric field when a particular wavelength of light is directed onto the material.

According to an exemplary embodiment, light activation of regions of a photoconductive TNR substrate may form a local electric field. The resulting open-circuit voltage of the illuminated photoconductive TNR substrate and photo-generated electron hole pairs allow for EPD of the nanoparticles toward the photoconductive TNR substrate to occur.

According to various embodiments, the conductive material 114 of the photoconductive layer 116 may be tuned according to a particular wavelength of light to generate an electric field 126 (as shown in FIG. 1A) in response to that particular wavelength of light. For example, in one approach, a window with a UV-specific conductive material in the photoconductive substrate may become obscured due to deposition of particles in response to UV light directed on the window. In another approach, a window with an infrared light-specific conductive material in the photoconductive substrate may become obscured due to deposition of particles in response to infrared light directed on the window.

The photoconductive electrode may be tuned using one or more different materials with a different band gap energy and/or effective to shift the band gap energy of the photoconductive electrode. In some approaches, the photoconductive electrode may be tuned by doping the material of the photoconductive to shift the band gap energy either lower or higher. The band gap energy corresponds to the energy of incoming light necessary to make the material conductive (i.e., the movement of electrons from valence band to conduction band). Doping a material to make the band gap energy higher may result in a photoconductive electrode responsive to higher energy light (for example, X-ray>ultraviolet>visible>infrared, etc.). Alternatively, doping a material to make the band gap energy lower may result in a photoconductive electrode responsive to lower energy light.

In various embodiments, conditions of processing the photoconductive electrode may also be changed to tune the photoconductive electrode. A specific example is a titanium dioxide electrode. During fabrication of the photoconductive electrode, the titanium dioxide electrode may be annealed in a hydrogen gas atmosphere that shifts the band gap energy so light at 405 nm activates the electrode. Without wishing to be bound by any theory, the inventors believe that without this step of annealing the electrode in a hydrogen gas atmosphere to achieve an appropriate band gap energy, the titanium dioxide electrode would not be able to perform EPD with the 405 nm light source because the material would absorb too little of the light energy.

In various embodiments, the particles 108 are nanoparticles. In some embodiments, the particles may be in the nanoscale range of greater than about 1 nm in diameter and less than about 500 nm in diameter. Moreover, the concentration of particles 108 may be effective to render the solution substantially transparent when the particles are homogeneously dispersed in the solution 110. In some approaches, substantially transparent may include at least about 95% light transmittance.

In some embodiments, as illustrated in FIG. 1A, the particles 108 may have a color other than black, white, and gray, where the particles 108 in the solution 110 may be attracted to illuminated portions 122 of the photoconductive layer 116 thereby creating a translucent layer 124 in the color. The size, type, and dispersity of particles 108 in solution 110 may be changed in order to affect the color display.

In various embodiments, the properties of the nanoparticles may be tuned. In some approaches, mixtures of nanoparticles of different sizes and color may be used. The size of the nanoparticles may be restricted by the solubility of the nanoparticles in solvent. The nanoparticles may be designed to look colorful (or of a specific color) when the nanoparticles gather on the photoconductive electrode. The properties of the nanoparticles may be tuned to exhibit different colors, so that the window may turn translucent in any desired color. In some approaches, the specific color of the region obscured due to deposition of particles may be tuned.

In one embodiment, the concentration of nanoparticles in the solution in the chamber may be effective to create at least translucence when the photoconductive layer is illuminated thereby causing the particles to become deposited on the photoconductive layer. Translucence may be defined as blocking as much as 5% of light and thereby allowing at least 95% transparency.

In another embodiment, the concentration of nanoparticles in the solution in the chamber may be effective to create at least substantial opacity when the photoconductive layer is illuminated thereby causing the particles to become deposited on the photoconductive layer. As the opposite of translucence, opacity may be defined as blocking at least 95% of light from passing therethrough.

In preferred embodiments, the deposition of particles on the photoconductive layer is not permanent, but rather, the deposition of particles is substantially reversible, e.g., at least 98% of the deposited particles return to suspension when illumination is absent. Thus, the window may return to its original state, for example, greater than 90% transparency, ideally greater than 95% transparency.

According to various embodiments, properties that tune the rate of change of the opacity (nonopaque toward opaqueness as particles become deposited) in the chamber may include the dispersity of the nanoparticles in solution, the color of the nanoparticles, transparency of the original solution, etc. The rate of nanoparticles gathering on the photoconductive electrode may be very quick, in which the illuminated portion of a window becomes nearly instantaneously obscured, or may become obscured within a defined period, for example, 1 minute, 5 minutes, etc. for a given light intensity. The degree of color or transparency change of the EPD in response to light may be tuned with the particle size and changes in mono/polydispersity of the particles in solution between the window panes.

In various embodiments, the solution 110 that suspends the nanoparticles may be water. In other embodiments, the solution 110 that suspends the nanoparticles may be an organic solvent. In yet other embodiments, the solution 110 that suspends the nanoparticles may be an inorganic solvent. In some approaches, a solution 110 with a boiling point of at least about 150° C. (for example, propylene carbonate) may be desired if used in an environment with high intensity light and/or heat. The solvent selected may depend on the solubility of the nanoparticles in that solvent. The solvent may also be one or more "green" solvents that are environmentally friendly.

According to one embodiment, a mask may be positioned to cast a shadow on the photoconductive layer. In some approaches, the particles in solution may be attracted to portions of the photoconductive layer not under a shadow of a mask. One embodiment of a method includes forming a patterned display by light induced electrophoretic deposition. In some approaches, the photoconductive electrode (photoconductive layer 116) of the first sheet 106 can be patterned with a photo mask to block light 112. In other approaches, the light 112 may illuminate the photoconductive electrode (photoconductive layer 116) according to a pattern. Electrophoretic deposition of the particles may only occur in regions of illumination.

In various embodiments, the light may originate from other directions. In some approaches, the light may originate from the side of the photoconductive electrode. In other approaches, the light may originate from the back of the photoelectrode.

Another embodiment of a method provides un-patterned shade by light-induced electrophoretic deposition. In this method, there is no photo mask on the photoconductive electrode, so that when light shines on the photoconductor, the deposition of the particles from suspension covers the entire area of the photoconductive electrode. In some approaches, the amount of color or transparency change, for example, tinting, in the window may vary based on the amount of sunlight shining on the window or the intensity of certain wavelengths of light, e.g. ultraviolet light. Thus various levels of shading of the window may occur throughout a typical day.

In use, various apparatuses described herein may provide patterned or unpatterned shading in photodetector displays and smart windows. Light from the sun may induce EPD to occur in a window-sized EPD cell, which darkens the window pane. After the sun is no longer shining on the substrate, the particles resuspend and the opacity of the window is reduced.

Self-powered, reversible light-directed EPD may be used for creative window shades or displays of arbitrary sizes, e.g., less than 25 square centimeters to greater than 3 square meters and any size in between, in which the incident light intensity may control the opacity of the shading. In some approaches, the window structures may exhibit curvature, for example, fish bowls, domes, curved glass, etc. The EPD described herein may be tuned to be sensitive to different wavelengths of light. For example, a display in a vending machine may have a display window that changes depending on whether the vending machine is in use. When not in use, a light shines on the display window, for example, light shines from a projector, creating a patterned advertisement, and then when the vending machine is in use, the light is turned off (removed) from the display window, the display window returns to transparent, and the choices are visible to the user.

One embodiment of the device may be able to detect light at different wavelengths. The device is tuned to detect a specific wavelength, so that when light at that wavelength is present in the area, the device, a display window, smart window, etc., become obscured due to deposition of particles and displays a given pattern. For example, a large sign may be constructed at a beach. On days when the UV index is high, the sign, when activated by the actual UV rays from the sun, may display a patterned image that warns beach goers that the sun is unsafe and to apply sun protection. The sign may also be programmed to display a meter of the UV index (level of opacity) as the intensity of the UV rays increases.

Moreover, methods described herein may be applicable to light-powered nanoparticle filtration.

Various embodiments described herein may be useful for cooling buildings. The self-powered, light-directed EPD windows may absorb certain wavelengths of light, pull the nanoparticles out of solution and block the wavelengths of light from coming into the building thereby cooling the building. At night, without sunlight, the nanoparticles return to solution, the windows become transparent, and heat radiates out of the building. These smart windows function without electricity; the sunlight activates the photoconductive electrode to generate the localized electric field to move the nanoparticles within the window. The light directed EPD is reversible in the absence of incident light.

Experimental Methods

The following description sets forth several experiments performed by the inventors. The description of the experiments is provided by way of example only and should not be considered limiting in any way.

Electrophoretic Deposition (EPD) Set Up

The deposition cells were constructed of two substrates separated by a layer of 25 μm thick polyimide tape. The photoconductive layer (deposition electrode) was fabricated with a conductive layer of fluorine-doped tin oxide (FTO) coated onto a transparent material of a glass substrate. Photoconductive material, titania nanorods (TNR), were hydrothermally grown onto the conductive layer following conventional methods. The counter substrate was either FTO coated glass or plain fused silica. The tape layer had a rectangular section cut out of it in the center to create a region for the particle suspension and was then adhered to the counter substrate. 10-20 μL of particle suspension was pipetted onto the counter substrate and then the deposition substrate was placed on top with the photoconductive layer exposed to the particle suspension. Edges of the deposition cells were secured so that light did not access the deposition region.

Photoconductive Substrate Preparation

Titania nanorods (TNR) were grown hydrothermally and prepared following conventional techniques. Briefly, 25 mm square, 1.1 mm thick fluorine-doped tin oxide (FTO) coated glass substrates were cleaned ultrasonically for 60 minutes in a 1:1:1 acetone:deionized water:isopropanol bath and then dried with nitrogen gas. 1 mL of titanium (IV) butoxide was added to 60 mL of 6 M HCl and then stirred for approximately 5 minutes (the solution became clear). The FTO substrates were placed inside a Teflon cut with the conductive side facing the walls of the container. With the Teflon cup placed inside an autoclave, the growth solution was added and the autoclave sealed. The synthesis was performed in a box furnace at 200° C. for 5 hours. After the autoclave has cooled to room temperature, the titania substrates were washed with deionized water and then dried with nitrogen gas. A razorblade was used to remove any unwanted precipitation from the backside of the substrate and scratch off 1-2 mm of nanowires from opposite sides of the substrate to expose the FTO. The substrates were then annealed in a box furnace at 550° C. for 3 hours and then again in pure hydrogen atmosphere at 350° C. for 30 minutes.

Particle Suspension Preparation

A boron particle suspension recipe was either 3.75 vol % Boron (SM-031114, Specialty Materials Inc., Boron nanopowder) in 100% ethanol or 5 vol % in 100% propylene carbonate (PC). Nanoparticles were measured in a polypropylene cup to which the solvent was added. The suspension was then mixed and sonicated for 2 minutes. This process was repeated once more with additional mixing and sonication cycles. The silica coated $Fe_3O_4$ (magnetite) nanoclusters and silica coated $\alpha$-$Fe_2O_3$ (hematite) nanocubes were synthesized according to conventional methods.

Synthesis of $\alpha Fe_2O_3$ Nanocubes $\alpha Fe_2O_3$ nanocubes were prepared using a conventional hydrothermal approach. Briefly, 0.9 g of poly(vinyl pyrrolidone) (PVP, Sigma-Aldrich, Mw=55,000) was added to 20 mL of anhydrous N,N-dimethylformamide (Sigma-Aldrich, 99.8%) and stirred for 30 minutes to completely dissolve the reagents. Thereafter, 0.05 mmol of $Fe(NO_3)_3 \cdot 9H_2O$ (Sigma-Aldrich, >99.95%) was added in the solution, vigorously stirred for 15 minutes, and transferred into a Teflon-lined stainless-steel autoclave (with a capacity of 30 mL). The autoclave was subsequently heated to 180° C. for 30 hours and removed to convectively cool to room temperature.

Synthesis of $Fe_3O_4$ Nanoclusters $Fe_3O_4$ nanoclusters were prepared using conventional techniques. Briefly, in a typical preparation, 1.35 g $FeCl_2 \cdot 6H_2O$ (Sigma-Aldrich, >99%) was dissolved in 70 mL ethylene glycol (Sigma-Aldrich, >99.8%). Subsequently, 3.854 g ammonium acetate (Fisher Scientific, >97%) was added to the solution and the solution was vigorously stirred for 30 minutes under an argon atmosphere. Then 0.5 g. sodium citrate was added to the mixture and stirred for another 30 minutes and the mixtures were heated to 160° C. and allowed to proceed for 1 hour under inert atmosphere to ensure the solution was completely dissolved. After cooling to room temperature, 15 mL of the solution was transferred into a Teflon lined stainless steel autoclave (with a capacity of 20 mL) and heated to 200° C. for 14 hours and allowed to cool naturally to room temperature.

Both as prepared $Fe_2O_3$ nanocubes and $Fe_3O_4$ nanoclusters were later isolated from the mother liquor by centrifugation at 10,000 rpm for 20 minutes, respectively and washed with a mixture of water and ethanol (EtOH) (vwater: vEtOH=1:1) for 3 times and stored in EtOH for future use.

Synthesis of αFe$_2$O$_3$/SiO$_2$ Core/Shell Nanoparticles

αFe$_2$O$_3$/SiO$_2$ and Fe$_3$O$_4$/SiO$_2$ core/shell colloids were prepared through a modified conventional technique. For αFe$_2$O$_3$/SiO$_2$, 20 mg of αFe$_2$O$_3$ nanocubes were added to 20 mL EtOH with 1 mL ammonium hydroxide (J. T. Baker, 28%) and 3 mL Mill-Q water and stirred vigorously for 10 minutes. 0.04 mL Tetraethyl orthosilicate (TEOS, Sigma-Aldrich, 99.999%) was added to the solution every 20 minutes for the desired time (e.g. 1 to 2 hours) so the total volume of TEOS was 0.08-0.32 mL and stirred for another 0-22 hours at room temperature. For Fe$_3$O$_4$/SiO$_2$, 20 mg of Fe$_3$O$_4$ nanoclusters were dispersed in 120 mL EtOH. Subsequently, 6 mL ammonium hydroxide and 18 mL Mill-Q water were added to the solution and stirred vigorously Optical Setup Referring the FIG. 2, an optical setup 200 was assembled as illustrated. A DMD projector 204 with a monochrome 405 nm LED diode (CEL5500-LED, sold by Digital Light Innovations having a sales office at 12317 Technology Blvd, Suite 100, Austin, Tex. 78727) provided the light for patterning the deposits. Magnification and real-time deposition monitoring capabilities were enabled by an assembly of lenses 210 positioned at approximately 100 mm from the projector 204 in the path (right arrow) of the projected light 203. 100 mm fl achromat doublets 206 (AC254-100-A-ML, Thorlabs) were attached to either side of an uncoated pellicle 212 (CM1-BP108, Thorlabs) in the axis of projection. A 50 mm fl achromat doublet 208 (AC254-50-A-ML, Thorlabs) was attached to the side adjacent to the 100 mm achromats 206. A CMOS camera 214 (DCC1545M-GL, Thorlabs) with an absorptive neutral density filter (NE30A, OD=3.0, Thorlabs) was placed at the focal point of the 50 mm achromat doublet 208 in order to monitor the projected image in real time. The intensity of the projected light was measured to be 80 mW/cm$^2$ by a power meter (PM100D with sensor S120VC, Thorlabs) at the plane of deposition.

Light-Directed EPD

Figure 2:
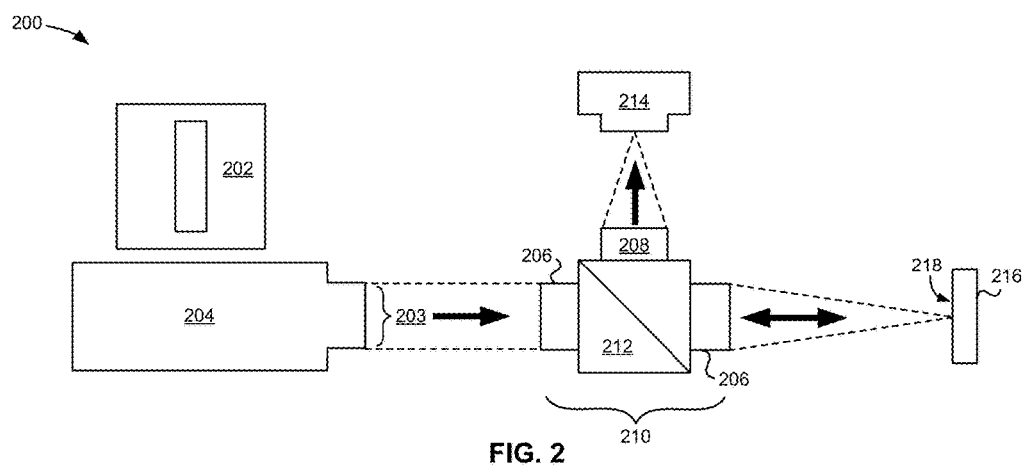
FIG. 2 illustrates an optical setup used in light directed EPD according to various embodiments.

Referring to FIG. 2, for light-directed EPD the deposition cell 216 containing the particle suspension was positioned vertically (perpendicular to ground) at approximately the focal point of the projected image 202 with the back of the photoconductive electrode 218 (TNR substrate) facing the light. The projector 204 was turned on and the cell position adjusted so that image was in focus. The desired image 202 was projected onto the backside of the photoconductive electrode 218 of the cell 216 for one minute.

Solar EPD

A deposition cell containing boron in PC was constructed and a laser cut photo mask with a patterned logo was attached to the back of the photoconductive electrode (TNR substrate). The photoconductive electrode side of the cells with the patterned logo attached was set up facing the sun for 5 minutes. The front side of the cell was blocked to prevent reflective light shining back into the cell.

Resuspension of Particles

Three cells with each cell containing one of each hematite, magnetite, and boron suspension were created. A pattern was projected onto each cell for 1 minute and then the light removed. An image of each cell was taken immediately afterwards and again after 90 minutes had passed.

The Effect of Wavelength of Light on Deposition

A cell containing hematite suspension was created. An aluminum photo mask with a laser cut pattern was fixed to the photoconductive (TNR substrate) side of the cell. Light was shined on the cell through the aluminum mask with a mercury arc lamp (X-cite 120Q, Lumen Dynamics) on the first aperture (intensity of 50 mW/cm$^2$) for 1-2 minutes. This experiment was performed once without an LP filter and repeated with a 435 nm (FGL435S, Thorlabs) or 490 nm (FGL4955, Thorlabs) LP filter near the light source.

The Effect of Intensity of Light

Absorptive neutral density filters were placed in the path of the light source to reduce the intensity of light. Electrophoretic deposition of boron in PC was performed with a neutral density filter with an optical density of 2.0 (NE2R20B, Thorlabs) in the path of the projected pattern, and repeated with an additional filter with an optical density of 0.6 (NE06A, Thorlabs) attached to the 100 mm lens nearest the deposition cell (total optical density of 2.6).

Experimental Results

A typical light directed EPD experiment without an applied voltage was set up as illustrated in FIG. 1A. A spacer 120 made out of 25 μm Kapton tape separated a piece of glass (second sheet 104) and a photoconductive electrode (TNR substrate) (First sheet 106) and held the particle suspension 102 in place between the glass and photoconductive electrode. When light 112 illuminated portions 122 of the substrate (photoconductive layer 116), an electric field 126 was generated at the portion 122 of the illumination. Particles 108 followed the electric field 126 lines and deposited onto the illuminated portion 122 of the substrate (photoconductive layer 116). Once the photoconductive layer 116 was no longer being illuminated by light, the particles 108 began to resuspend. A schematic of the optical system used to pattern the deposits is shown in FIG. 2.

Deposition of particles was observed in the EPD system without a counter electrode and without applied potential.

An initial light directed EPD experiment showed deposition of particles occurred in a cell comprised of a photoconductive electrode (TNR substrate) one side and a conductive substrate (FTO substrate) on the opposing side of the cell without applied voltage to the cell.

No Counter Electrode

A cell with a photoconductive electrode (TNR substrate) on one side and plain glass on the other side of the cell resulted in deposition of particles on the photoconductive electrode side when light was directed onto the photoconductive side.

No Applied Potential

A cell with FTO substrates (conductive material) on either side of the particle suspension (boron in PC) did not result in deposition of particles when light was shined on one side because there was no potential across the cell. Thus, light shining on the photoconductive electrode allows a potential to form across the cell between the two sides: the photoconductive electrode and the transparent sheet (not a counter electrode) without applied voltage.

FIGS. 3A-3B show images of light directed EPD with a cell with a photoconductive substrate (TNR substrate) on one side of the cell and plain glass on the opposite side of the cell. A thin film of boron in PC suspension filled the cell between the side with photoconductive substrate and the glass side (FIG. 3A). The cell was held parallel to the ground and insulated with rubber gasket material between the cell and the clips securing the cell. Light-directed EPD without applied bias was performed for one minute. The image in FIG. 3B shows a patterned deposit after one minute of light directed EPD on the cell. From these experiments, the photoconductive substrate (TNR substrate) may be important to light-directed EPD without an applied bias.

Mechanism of Deposition.

To further test for the effect of the photoconductive material on electrophoretic deposition without an applied field, a series of long pass filters were used to block incident light. Long pass filters were placed in the path of light between the mercury arc lamp and a deposition cell as illustrated in FIG. 2. Deposition was observed during with the control cell (incident light with no filter) but deposition was not observed when 435 nm and 490 nm filters were in place. Rutile titania is a wideband gap semiconductor and has a bandgap corresponding to 3.06 eV (405 nm). No deposition was observed when filters were in place because the incident wavelengths of light had insufficient energy to kick electrons into the conduction band.

Absorptive neutral density filters were placed in the path of projected light to determine the limits of light intensity deposition. Deposition was observed when using a filter with an optical density of 2.0 (light intensity reduced to 216 $\mu W/cm^2$) but deposition was not observed using a filter with optical density of 2.6 (light intensity of 70 $\mu W/cm^2$).

Sunlight Alone

A photoconductive substrate (TNR)/glass cell with boron in PC suspension was constructed and a laser cut aluminum mask was attached to the back of the TNR substrate. After exposure to sunlight for 5 minutes, deposition formed on the photoconductive substrate (FIG. 3C-3D).

Absence of Illumination and Resuspension of Particles

To test for the ability for particles to resuspend in solution following EPD, three light-directed EPD were performed with boron (FIGS. 4A and 4D), hematite (FIGS. 4B and 4E), or magnetite (FIGS. 4C and 4F) particles suspended in PC. Each particle solution was placed in a photoconductive substrate (TNR)/glass cell. A patterned image was projected with light onto the TNR substrate for one minute for each particle suspension (FIG. 4A, 4B, 4C) and after 90 minutes of no illumination, an image was captured for each cell with particle suspension (FIG. 4D, 4E, 4F). All particles resuspended to some degree in the absence of illumination. Particles in each suspension resuspended back into solution to some degree by 90 minutes without illumination, but the boron suspension resuspended completely in 90 minutes without illumination (FIG. 4D).

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   a first sheet being nonopaque, wherein the first sheet comprises a photoconductive layer;
   a second sheet spaced from the first sheet, the second sheet being nonopaque;
   a spacer positioned between the first sheet and the second sheet;
   a chamber defined between the first and second sheets and the spacer; and
   a fluidic solution in the chamber, the solution having a plurality of particles,
   wherein the particles in the solution are attracted to illuminated portions of the photoconductive layer upon illumination of said portions in the absence of an external voltage applied to the first and second sheets.

2. A system as recited in claim 1, wherein the photoconductive layer is comprised of a photoconductive material layered on a nonopaque conductive material.

3. A system as recited in claim 2, wherein the photoconductive layer is a photovoltaic material.

4. A system as recited in claim 2, wherein the conductive material includes at least one conductor selected from a group consisting of: indium tin oxide, fluorine-doped tin oxide, metal nanowires, metal mesh, graphene, and carbon nanotubes.

5. A system as recited in claim 1, wherein the first and second sheets are configured in an open circuit arrangement.

6. A system as recited in claim 1, wherein the particles have a color other than black, white, and gray, wherein the particles in the solution are attracted to illuminated portions of the photoconductive layer thereby creating a translucent layer in the color.

7. A system as recited in claim 1, wherein the particles are nanoparticles, wherein a concentration of particles is effective to render the solution substantially transparent when the particles are homogeneously dispersed in the solution.

8. A system as recited in claim 7, wherein the concentration of nanoparticles in the solution in the chamber is effective to create at least translucence when the photoconductive layer is illuminated thereby causing the particles to become deposited on the photoconductive layer.

9. A system as recited in claim 8, wherein the deposition of particles on the photoconductive layer is reversible.

10. A system as recited in claim 1, comprising a mask positioned to cast a shadow on the photoconductive layer.

11. A system as recited in claim 1, wherein the second sheet does not function as a counter electrode.

12. A system as recited in claim 1, wherein the chamber is sealed.

13. A system as recited in claim 1, wherein the solution is a solvent with a boiling point at least about 150 degrees Celsius.

14. A system, comprising:
    a first sheet being nonopaque, wherein the first sheet comprises a photoconductive layer;
    a second sheet spaced from the first sheet, the second sheet being nonopaque, wherein the second sheet does not function as a counter electrode;
    a spacer positioned between the first sheet and the second sheet;
    a chamber defined between the first and second sheets and the spacer; and
    a fluidic solution in the chamber, the solution having a plurality of nanoparticles in suspension,
    wherein the nanoparticles in the solution are attracted to illuminated portions of the photoconductive layer upon illumination of said portions in the absence of an external voltage applied to the first and second sheets,
    wherein the first and second sheets are in an open circuit arrangement,
    wherein the nanoparticles return to suspension in the solution upon absence of illumination of said portions.

15. A system as recited in claim 14, wherein the photoconductive layer is comprised of a photoconductive material layered on a nonopaque conductive material.

16. A system as recited in claim 15, wherein the conductive material includes at least one conductor selected from a group consisting of: indium tin oxide, fluorine-doped tin oxide, metal nanowires, metal mesh, graphene, and carbon nanotubes.

17. A system as recited in claim 14, wherein the nanoparticles have a color other than black, white, and gray, wherein the nanoparticles in the solution are attracted to illuminated portions of the photoconductive layer thereby creating a translucent layer in the color.

18. A system as recited in claim 14, wherein a concentration of nanoparticles is effective to render the solution substantially transparent when the nanoparticles are homogeneously dispersed in the solution.

19. A system as recited in claim 18, wherein the concentration of nanoparticles in the solution in the chamber is effective to create at least translucence when the photoconductive layer is illuminated thereby causing the nanoparticles to become deposited on the photoconductive layer.

20. A system as recited in claim 14, comprising a mask positioned to cast a shadow on the photoconductive layer.

* * * * *